US008717897B2

(12) United States Patent
Aboul-Magd et al.

(10) Patent No.: US 8,717,897 B2
(45) Date of Patent: *May 6, 2014

(54) METHOD AND SYSTEM FOR PACKET DISCARD PRECEDENCE FOR VIDEO TRANSPORT

(71) Applicant: Rockstar Consortium US LP, Plano, TX (US)

(72) Inventors: Osama Aboul-Magd, Kanata (CA); Bilel Jamoussi, Nashua, NH (US)

(73) Assignee: Rockstar Consoritium US LP, Plano, TX (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/722,074

(22) Filed: Dec. 20, 2012

(65) Prior Publication Data

US 2013/0114411 A1    May 9, 2013

Related U.S. Application Data

(63) Continuation of application No. 12/333,835, filed on Dec. 12, 2008, now Pat. No. 8,363,548.

(51) Int. Cl.
*H04J 3/14* (2006.01)
*H04L 12/26* (2006.01)
*H04B 1/66* (2006.01)

(52) U.S. Cl.
USPC ............ 370/235; 370/389; 370/474; 715/723

(58) Field of Classification Search
USPC .............. 370/229, 230, 230.1, 231, 235, 389, 370/474; 715/723
See application file for complete search history.

(56) References Cited

U.S. PATENT DOCUMENTS

| | | | | |
|---|---|---|---|---|
| 6,570,926 B1 * | 5/2003 | Agrawal et al. | .......... | 375/240.27 |
| 7,349,386 B1 * | 3/2008 | Gou | .............. | 370/356 |
| 7,609,709 B2 * | 10/2009 | Kim et al. | ....... | 370/412 |
| 7,848,237 B2 * | 12/2010 | Todd et al. | ....... | 370/235 |
| 7,949,052 B1 * | 5/2011 | Wu et al. | .......... | 375/240.26 |
| 8,271,674 B2 * | 9/2012 | Takacs et al. | ............. | 709/231 |
| 2001/0047423 A1 * | 11/2001 | Shao et al. | .......... | 709/235 |
| 2001/0048662 A1 * | 12/2001 | Suzuki et al. | ............. | 370/230 |
| 2003/0195977 A1 * | 10/2003 | Liu et al. | ............ | 709/231 |
| 2006/0153228 A1 | 7/2006 | Stahl et al. | | |
| 2006/0182127 A1 * | 8/2006 | Park | .............. | 370/400 |
| 2007/0008884 A1 * | 1/2007 | Tang | ............. | 370/230 |
| 2007/0115969 A1 * | 5/2007 | Isnardi | ............ | 370/389 |

(Continued)

OTHER PUBLICATIONS

Non-Final Office Action for U.S. Appl. No. 12/333,835, mailed Mar. 28, 2012, 15 Pages.

(Continued)

*Primary Examiner* — Ahmed Elallam
(74) *Attorney, Agent, or Firm* — Withrow & Terranova, PLLC

(57) ABSTRACT

Discard precedence priority of packets carrying an encoded video stream in a packet network is determined based on priority information included in the encoded video stream. A video streamer segments an encoded video stream and encapsulates the segment in an Internet Protocol (IP) packet. Priority information associated with the IP packet is determined based on at least one priority indicator associated with the segment that was included in the encoded video stream. Alternately, priority information associated with an Ethernet frame is determined based on at least one priority indicator associated with the segment that was included in the encoded video stream.

20 Claims, 13 Drawing Sheets

(56) References Cited

U.S. PATENT DOCUMENTS

| | | | |
|---|---|---|---|
| 2008/0175148 A1* | 7/2008 | Todd et al. | 370/235 |
| 2008/0186852 A1* | 8/2008 | Sami et al. | 370/235 |
| 2009/0175353 A1* | 7/2009 | Suh et al. | 375/240.25 |
| 2010/0138885 A1* | 6/2010 | Haimi-Cohen | 725/109 |

OTHER PUBLICATIONS

Notice of Allowance for U.S. Appl. No. 12/333,835, mailed Sep. 14, 2012, 7 Pages.

\* cited by examiner

METHOD AND SYSTEM FOR PACKET DISCARD PRECEDENCE FOR VIDEO TRANSPORT

This application is a Continuation of U.S. patent application Ser. No. 12/333,835, entitled METHOD AND SYSTEM FOR PACKET DISCARD PRECEDENCE FOR VIDEO TRANSPORT, filed Dec. 12, 2008, currently pending, the disclosure of which is hereby incorporated by reference in its entirety.

FIELD OF THE INVENTION

This invention generally relates to prioritizing data packets, and in particular relates to using video encoding information for packet discard selection.

BACKGROUND OF THE INVENTION

Networks can become congested during periods of high usage. Network congestion increases the likelihood that packets being delivered over the network will not be delivered in a timely manner and, in some cases, packets may not delivered at all. For some types of applications, such as email applications or word processing applications, packet delay is not problematic. Moreover, if the packets are transported using a reliable transport technology, such as Transmission Control Protocol (TCP), the packets will eventually be resent if the recipient fails to acknowledge receipt. However, packet delay will greatly impact other types of applications, such as audio and video applications.

Certain network protocols include the ability to prioritize traffic to a limited extent. Packets typically obtain a priority based on an administrative setting that identifies certain categories of traffic, such as video traffic, as higher priority than non-video traffic. However, application-based priority may not be suitable where the majority of the traffic delivered over the network is the same application type.

Video is typically highly compressed before being transmitted over a network. The precise format of digital video varies depending on the type of encoder and encoding parameters used to generate the digitized video, but in general, video compression algorithms are based on reducing spatial redundancy and temporal redundancy. Spatial redundancy relates to similar samples within the same picture frame. For example, in a scene showing a close-up of a white sheet, a significant portion of the video information may be essentially the same data repeated over and over. Temporal redundancy relates to similar images between two adjacent picture frames. For example, in a scene showing very little movement, successive frames will be nearly identical to one another with only a very small portion of the video information changing from frame to frame. Video encoders are able to recognize such redundancy and generate data files that eliminate redundant video information but contain information that allows recreation of the redundant information during the decoding process so the video can be recreated and displayed at a quality very close to the original, uncompressed raw video. The encoding process results in a lower bit rate video stream than the original raw, uncompressed video stream.

A compressed digital video file or stream typically contains different types of video segments that have differing degrees of importance, or priority, based on the particular encoding algorithm used to create the digital video file. For example, Moving Picture Experts Group-2 (MPEG-2) encoders create three types of frames, referred to as an I-picture, a P-picture, and a B-picture. From the perspective of decoding the digital video file, an I-picture is more important than a P-picture or a B-picture because an I-picture is a reference frame, and a P-picture and a B-picture are predictively-coded pictures based on I-pictures. Consequently, if video packets must be discarded during times of network congestion, it would be beneficial if the video packets could be discarded based on the type of data carried by the video packet, rather than arbitrarily discarding video packets. What is needed, therefore, is a way to identify the types of video data carried by a video packet so that during congestion low-priority video packets can be discarded in favor of high-priority video packets.

SUMMARY OF THE INVENTION

The present invention uses video encoding information to set a priority field used by a network device to selectively discard video packets when a network is congested. According to one embodiment of the invention, a video encoder encodes a video into encoded video information. The encoded video information is segmented and encapsulated in a packet for delivery over a network. The packet has a packet payload portion for carrying the video segment and a packet header portion containing routing and priority information used by network devices while forwarding the packet through the network. Priority information relating to the respective video segment that is included in the encoded video information is mapped to a priority field in the packet header portion of the packet. A first packet carrying a video segment may be identified as a high priority packet based on the priority information included in the encoded video information, and a second packet carrying an adjacent video segment may be prioritized as a low priority packet based on the priority information included in the encoded video information. The packet is transmitted over the network for delivery to a user device. The network device responsible for forwarding packets determines that the network is congested and based on the priority field in the packet either forwards the packet or discards the packet.

According to one embodiment of the invention, video segments are encapsulated in a Real-time Transport Protocol (RTP) packet having an RTP payload portion for carrying the video segments and an RTP header portion. The RTP packet is then encapsulated in a User Datagram Protocol (UDP) packet having a payload portion for carrying the RTP packet, and a header portion. The UDP packet is then encapsulated in an Internet Protocol (IP) packet having a payload portion for carrying the UDP packet and an IP header. The IP packet is then encapsulated in an Ethernet frame having a payload portion for carrying the IP packet and a header portion. The IP packet uses a Differentiated Services (DS) Per-Hop-Behavior (PHB) group called Assured Forwarding (AF). The AF PHB group is a mechanism for offering different levels of forwarding assurances for IP packets. The AF group includes four AF classes, each of which has three possible drop precedence values. A desired AF class and drop precedence value is identified via a Differentiated Service Code Point (DSCP) field in the IP header. In case of congestion, the AF drop precedence value of a packet determines the relative importance of the packet within the respective AF class. The drop precedence value of the AF class is determined based on a priority indicator from the encoded video information associated with the video segment carried in the RTP payload.

According to another embodiment of the invention, the Ethernet frame header contains a user priority field comprising three bits of data. Rather than using a DSCP field in the IP header, the user priority field in the Ethernet frame header is set to a particular value to indicate a discard priority based on the priority indicator from the encoded video information associated with the video segment carried in the RTP payload. Using the user priority bits in the Ethernet frame header rather than the DSCP field in the IP header enables packet discarding decisions to be made at a lower level in a network stack.

According to one embodiment of the invention, the encoded video information is an MPEG-2 file, and the encoded video information is segmented into a plurality of transport stream packets. Each transport stream packet in the segment has an associated priority bit that can be set (i.e., "1") or reset (i.e., "0"). If the associated priority bit of any of the transport stream packets in the segment is set to indicate that the transport stream packet has a higher priority than other transport stream packets that have the priority bit reset, the priority information of the IP packet carrying the segment is set to indicate the transport stream packet should not be discarded. According to another embodiment of the invention, the priority information of the IP packet carrying the segment can vary based on the number of transport stream packets in the segment having the priority bit set. For example, if the segment comprises seven transport stream packets and if five to seven of the transport stream packets have the associated priority bit set, the priority information of the IP packet carrying the transport stream segments can be set to a first priority level to indicate that the segment should not be discarded. If two to four of the transport stream packets have the associated priority bit set, the priority information of the IP packet carrying the transport stream segments can be set to a second priority level that is lower than the first priority level. If none or one transport stream packet has the associated priority bit set, the priority information of the IP packet carrying the transport stream segments can be set to a third priority level that is lower than the second priority level.

According to another embodiment of the invention, the encoded video information is an MPEG-4 file, and the encoded video information is segmented into separate Network Abstraction Layer (NAL) units. The priority information of the packet carrying the NAL unit is based on a nal_ref_idc (NRI) value in an NRI field of a NAL header. According to another embodiment of the invention, each segment carries a plurality of NAL units, and the priority information of the packet carrying the plurality of NAL units is based on the highest NRI value of all the NAL units in the segment.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
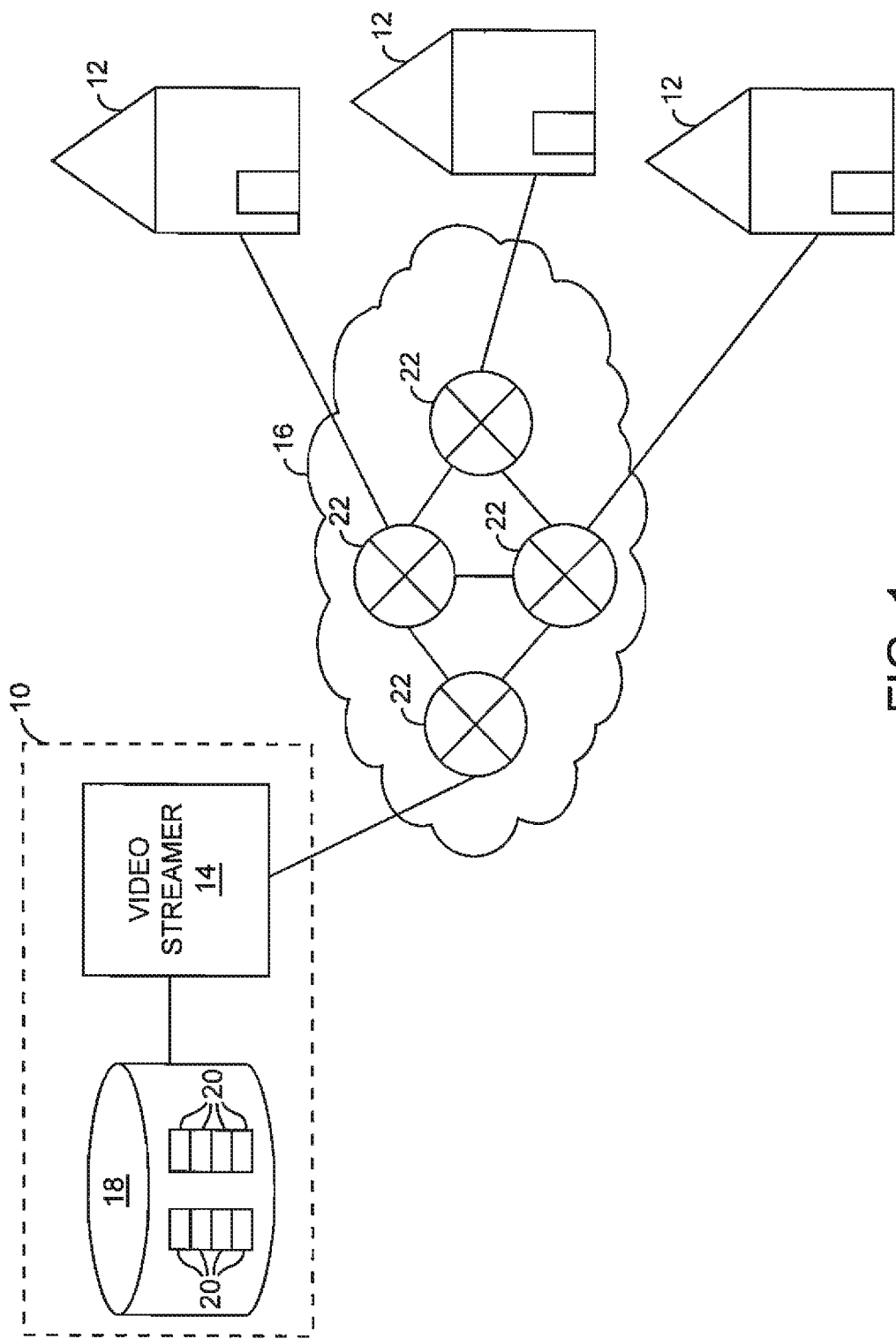
FIG. 1 is a block diagram illustrating a system suitable for carrying out aspects of the present invention.

The present invention relates to setting priority information of a packet carrying a video segment based on a priority indicator included in encoded video information from which the video segment was generated. The present invention enables selective discarding of video packets during network congestion in a manner that minimizes video playback disruption. FIG. 1 is a block diagram illustrating a system suitable for carrying out aspects of the present invention. A service provider 10 provides video programs, such as broadcast programming or video on demand programming, to a plurality of end users 12. The service provider 10 includes equipment, represented by a video streamer 14, capable of encapsulating and transmitting video to the end users 12 over a network 16. While for purposes of illustration the video streamer 14 is shown as a single apparatus, the functionality provided by the video streamer 14 may involve one or more pieces of equipment. A video storage 18 contains one or more encoded video files 20 that contain encoded video information associated with a respective program or movie. The encoded video files 20 can be in any suitable encoding format that includes in the encoded video information priority indicators that can be used to denote a priority of units of the encoded video information. The format of the units of encoded video information may differ depending on the particular encoding algorithm used. For example, if the video files are encoded with a Moving Pictures Expert Group-4 (MPEG-4) encoder, the units may be a Network Abstraction Layer (NAL) unit. If the video files are encoded with an MPEG-2 encoder, the units may be a Transport Stream Packet.

While for purposes of illustration the invention will be described herein in the context of a video on demand service, the invention can be used in the transport of encoded video in any context, including broadcast streams of programming in MPEG-4 or MPEG-2 formats. Moreover, while the encoded video files 20 are shown as being associated with the service provider 10 for purposes of illustration, in practice the encoded video files 20 may be provided upon request by a third party or, in the case of broadcast television, the service provider 10 typically receives an encoded video stream from an external programming source, such as the television networks NBC or ABC, on an ongoing basis.

Upon request by an end user 12 to view a particular program, the video streamer 14 begins to segment the respective encoded video file 20 into segments suitable for transport over the network 16. As will be described in greater detail herein, the video streamer 14 encapsulates the segments in packets, addresses the packets to the respective end user 12, and transmits or otherwise communicates the packets over the network 16 for delivery to the respective end user 12. The network 16 comprises one or more switching devices 22 that forward each packet to either another switching device 22 or the end user 12. The switching devices 22 can comprise any apparatus capable of receiving and forwarding a packet based on a destination address, and can comprise a router or an Ethernet switch, for example. The packets are ultimately delivered to a playback device associated with the end user 12, such as a set top box, that extracts the segment of encoded video information from the packet, decodes the encoded video information, and provides the content for playback to the end user 12 on a display device, such as a television or computer monitor.

Depending on the demand of the end users 12 and other factors, at times the network 16 may suffer congestion. Congestion as used herein means any determination by one or more switching devices 22 that a current rate of network traffic constitutes congestion. During periods of congestion, packets may not be delivered in a timely manner to an end user 12 or, if a packet is dropped or discarded, the packets may not be delivered at all. A discarded or delayed packet may or may not be problematic depending on the data contained in the packet and the network transport protocol used to deliver the packet. Some network transport protocols, such as Transmission Control Protocol (TCP), are reliable transport protocols that verify the delivery of each packet of information and will continue to re-transmit the packet of information until such verification is received. Other types of network transport protocols, such as User Datagram Protocol, provide unreliable transport of packets and do not verify whether a packet is delivered or not. Likewise, some applications such as email and word processing are not sensitive to packet delay, while other applications such as video and audio applications are extremely sensitive to delayed or discarded packets. During congestion, the switching devices 22 may discard packets to reduce congestion. The present invention provides a method and apparatus for intelligently discarding video packets based on priority indicators included in the encoded video information.

Figure 2:
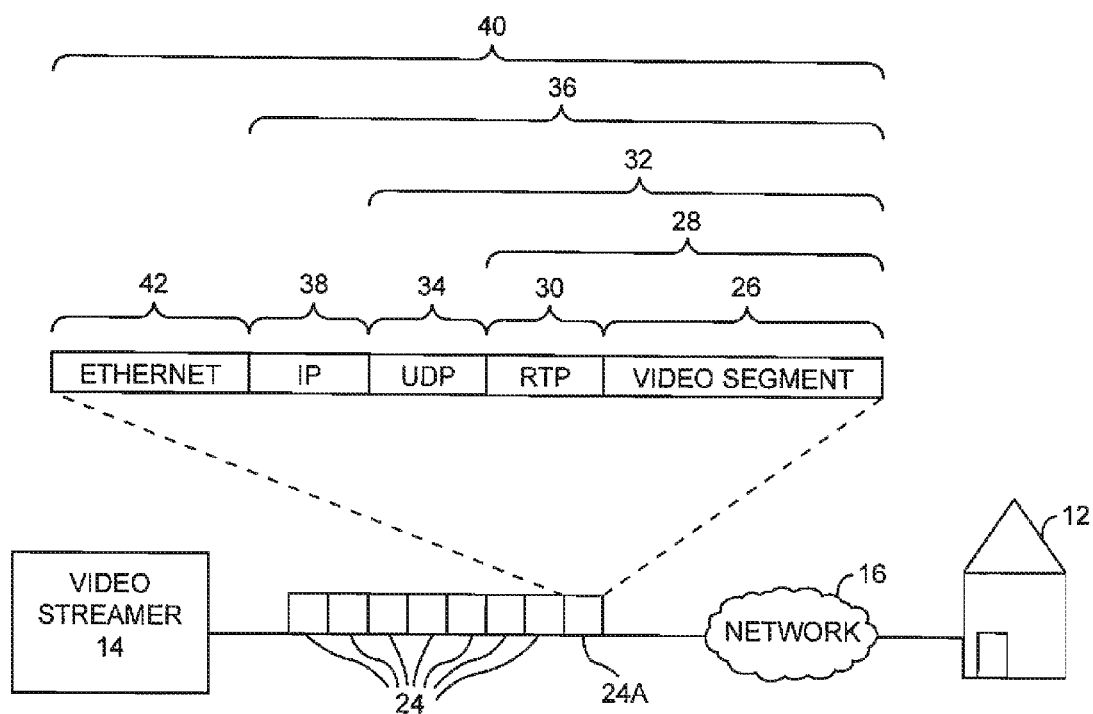
FIG. 2 is a block diagram illustrating components of a packet according to one embodiment of the invention.

FIG. 2 is a block diagram illustrating components of a packet according to one embodiment of the present invention. The video streamer 14 transmits a plurality of data packets 24 and 24A to the network 16 for delivery to the end user 12. The packet 24A is representative of each of the packets 24 and comprises a video segment 26 which includes one or more video units from a respective encoded video file 20. The video segment 26 is encapsulated in a Real-time Transport Protocol (RTP) packet 28 which includes an RTP header 30 and a payload portion that comprises the video segment 26. The RTP header 30 contains information that can be used for a variety of purposes as described in the Internet Engineering Task Force (IETF) Network Working Group Request for Comments 3550 entitled "RTP: A Transport Protocol for Real-Time Applications," which is hereby incorporated herein by reference in its entirety.

The RTP packet 28 is encapsulated in a User Datagram Packet (UDP) 32 which includes a UDP header 34 and a payload portion comprising the RTP packet 28. The UDP header 34 contains information that can be used for a variety of purposes as described in the IETF Request for Comments 768 entitled "User Datagram Protocol," which is hereby incorporated herein by reference in its entirety. The UDP packet 32 is encapsulated in an IP packet 36 which includes an Internet Protocol (IP) header 38 and a payload portion comprising the UDP packet 32. The IP header 38 includes information for routing by a layer three switching device 22, such as a router, and can include various additional information as described in the following IETF Requests for Comments, each of which is hereby incorporated herein by reference in its entirety:

Request for Comments 791 entitled "Internet Protocol Darpa Internet Program Protocol Specification;"

Request for Comments 2474 entitled "Definition of the Differentiated Services Field (DS Field) in the IPv4 and IPv6 Headers;"

Request for Comments 2475 entitled "An Architecture for Differentiated Services;"

Request for Comments 2597 entitled "Assured Forwarding PHB Group;"

Request for Comments 3140 entitled "Per Hop Behavior Identification Codes;"

Request for Comments 3246 entitled "An Expedited Forwarding PHB;" and

Request for Comments 4594 entitled "Configuration Guidelines for DiffServ Service Classes,"

The IP packet 36 is encapsulated in an Ethernet frame 40, which includes an Ethernet header 42 and a payload portion comprising the IP packet 36. The Ethernet header 42 includes various information including information for routing by a layer two switching device 22, such as an Ethernet switch. The Ethernet header 42 includes various additional information as defined in the Institute of Electrical and Electronics Engineers (IEEE) 802.3 standards, each of which is hereby incorporated herein by reference. References herein to layer three or layer two are references to the Open Systems Interconnection Basic Reference Model, as will be understood by those skilled in the art.

Figure 3:
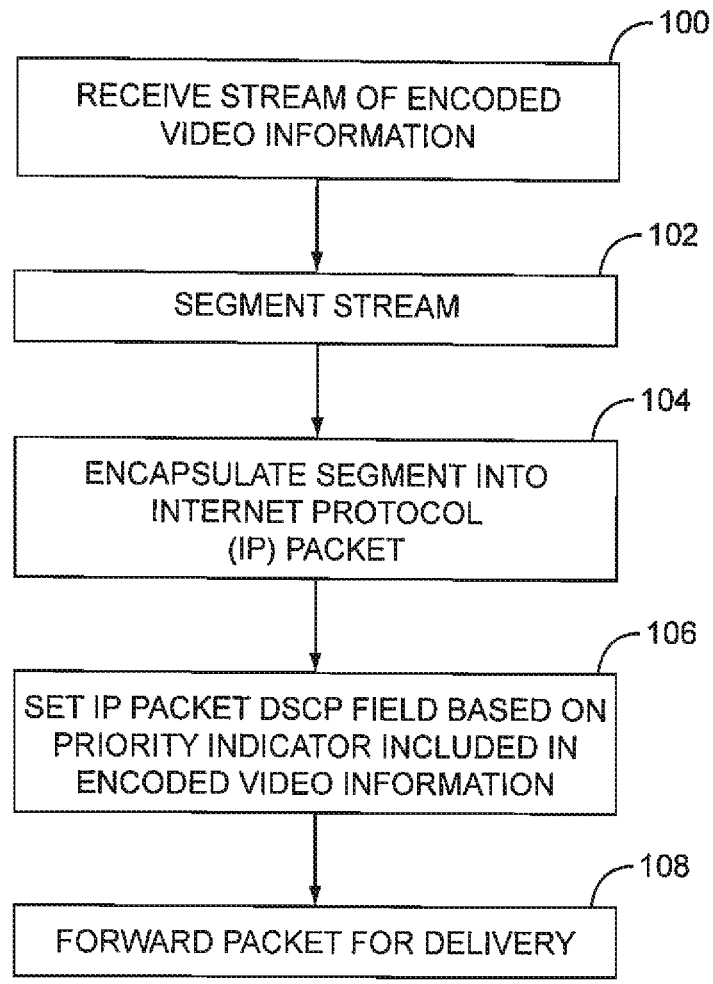
FIG. 3 is a flow diagram illustrating a method for setting priority information of a packet according to one embodiment of the invention.
Figure 4:
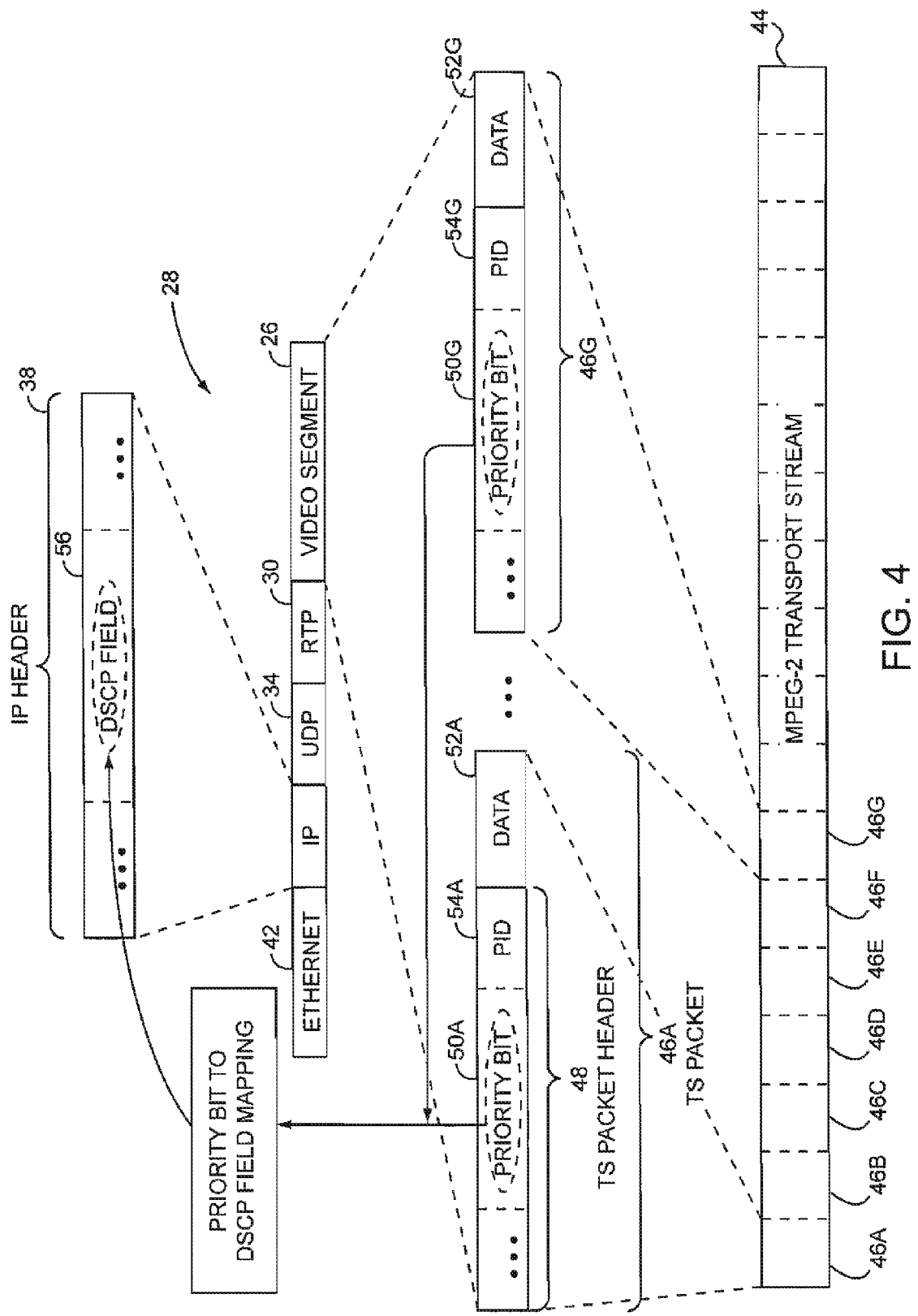
FIG. 4 is a block diagram illustrating a process for setting priority information of an Internet Protocol (IP) packet carrying Moving Pictures Expert Group-2 (MPEG-2) encoded video information according to one embodiment of the invention.

FIG. 3 is a flow diagram illustrating a method for setting priority information of a packet according to one embodiment of the invention. FIG. 4 is a block diagram illustrating a particular embodiment of the process described in FIG. 3 wherein MPEG-2 encoded video information is used to set priority information of a packet. For purposes of illustration FIGS. 3 and 4 will be discussed together. The video streamer 14 receives a stream of encoded video information (step 100), as illustrated in FIG. 4 by a video stream 44. For purposes of illustration it will be assumed that the stream of encoded video information is in MPEG-2 format, but the invention is not limited to MPEG-2 encoding and can be used with a variety of encoding formats. The stream of encoded video information may be associated with a file of encoded video information stored in the video storage 18, or may comprise a stream of encoded video information being provided over a feed from a broadcaster, such as NBC, or from being received from some other source.

The video streamer 14 segments the encoded video stream 44 in preparation for encapsulation of the segments into an RTP packet 28 (step 102). The segmentation can be any desired division of the video stream 44, so long as each segment has associated therewith one or more priority indicators that are included in the video stream 44. Depending on the transport protocol used, certain segmentations may be preferable to other segmentations. For example, assuming the segment will be encapsulated in an RTP packet 28, IETF Request for Comments 2250 entitled "RIP Payload Format for MPEG1/MPEG2 Video" (hereinafter "RFC 2250"), which is hereby incorporated herein by reference in its entirety, describes two approaches for encapsulating an MPEG-2 video stream in an RTP packet 28. One approach involves the use of an MPEG-2 transport stream (TS). A transport stream comprises a number of fixed length transport stream packets, such as TS packets 46A-46G. The video segment 26 can comprise one or more of the TS packets 46. Typically, seven TS packets, such as TS packets 46A-46G, are included in the video segment 26. A TS packet header 48 includes various information, including a priority bit field 50A indicating a priority of the video information contained in a payload portion 52A of the TS packet 46A relative to other TS packets 46 having the same package identifier (PID) value. Assume for purposes of illustration the video segment 26 will carry the TS packets 46A-46G. The video segment 26 is then encapsulated in an RTP packet 30, which is in turn encapsulated in a UDP packet 32. The UDP packet 34 is encapsulated in an IP packet 36 (step 104).

For purposes of illustration, assume that the network 16 uses Differentiated Services (DS). The video streamer 14 sets a DSCP field 56 of the IP header 38 based on the priority bit fields 50A-50G from the TS packets 46A-46G in the video segment 26 (step 106). Preferably an Assured Forwarding Per-Hop-Behavior Group is used. There are four AF classes available in the AF group. Each AF class offers three levels of drop, or discard, precedence. Typically, a single AF class is sufficient for use in the present invention, but in applications where greater than three packet discard preference levels are desired, multiple AF classes may be used. Note that a discard precedence value is the inverse of a packet priority in that a high discard precedence value indicates a low packet priority (e.g., a packet with a high discard precedence value will be discarded before a packet with a low discard precedence value). A particular AF class and discard precedence value is indicated through the use of an AF codepoint. An AF codepoint is a six bit value. For example, AF class 1 with low discard precedence has an AF codepoint='001010' and will be referred to herein as an "AF1LDP codepoint," AF class 1 with medium discard precedence has an AF codepoint='001100' and will be referred to herein as an "AF1MDP codepoint," and AF class 1 with high discard precedence has an AF codepoint='001110' and will be referred to herein as an "AF1HDP codepoint."

According to one embodiment of the invention, the discard precedence of the video segment 26 is determined by examining the priority bit fields 50A-50G of the TS packets 46A-46G in the video segment 26. If any of the priority bit fields 50A-50G are set, then the DSCP field 56 is set to the value of the AF1LDP codepoint. If none of the priority bit fields 50A-50G are set, the DSCP field 56 is set to the value of the AF1HDP codepoint. According to another embodiment of the invention, three levels of discard precedence are used by basing the discard precedence of the video segment 26 on the number of priority bit fields 50A-50G that are set in the TS packets 46A-46G. For example, if N represents the number of TS packets 46 in the video segment 26, assume that $N_p$ represents the number of TS packets 46 that have the associated priority bit field 50 set. If $0<N_p<=N_1$, then the DSCP field 56 is set to the AF1HDP codepoint. If $N_1<N_p<=N_2$, then the DSCP field 56 is set to the AF1MDP codepoint. If $N_2<N_p<=N$, then the DSCP field 56 is set to the AF1LDP codepoint. $N_1$ and $N_2$ can be set to any desired number of TS packets 46. For example, if N=7, $N_2$ may be equal to 3, and $N_1$ may be equal to 1. After the DSCP field 56 is set to the desired AF1 codepoint, the IP packet 36 is encapsulated in an Ethernet frame 40 and forwarded over the network 16 for delivery to the end user 12 (step 108).

Figure 5:
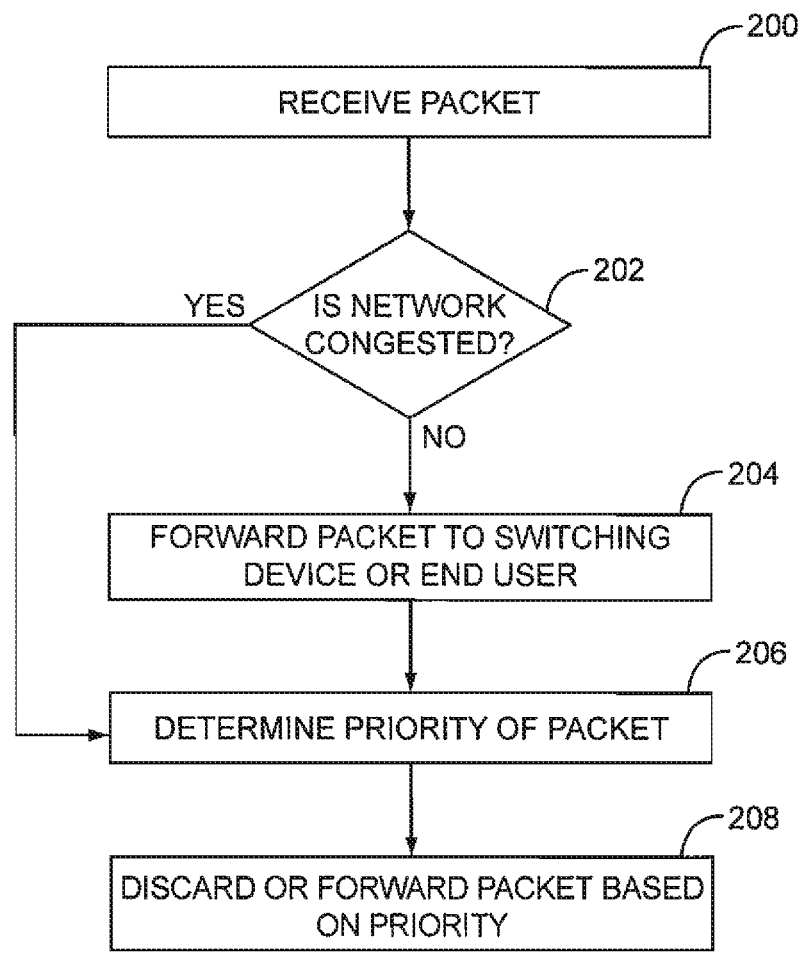
FIG. 5 is a flow chart illustrating a process for discarding a packet based on priority information of the packet according to one embodiment of the invention.

FIG. 5 is a flow diagram illustrating a process for discarding a packet according to one embodiment of the invention. The switching device 22 receives the Ethernet frame 40 carrying the IP packet 36 (step 200). The switching device 22 determines whether the network 16 is congested (step 202). The determination can be made using any designated criteria suitable for defining the network 16 as being congested. For example, the switching device 22 can determine an incoming packet queue fill at the arrival instant of the IP packet 36. If the queue length exceeds a predetermined threshold, the switching device 22 may determine that the network 16 is congested. If the network 16 is not congested, the Ethernet frame 40 is delivered to either another switching device 22 that is in the path to the end user 12 or is delivered directly to the end user 12 if the switching device 22 is the last switching device 22 along the path to the end user 12 (step 204). If the network 16 is congested, the switching device 22 obtains the AF codepoint from the DSCP field 56 of the Ethernet frame 40 (step 206). If the AF codepoint is an AF1HDP, the Ethernet frame 40 is discarded. If the AF codepoint is an AF1LDP, the Ethernet frame 40 is forwarded to another switching device 22 or the end user 12, as described above (step 208).

Figure 6:
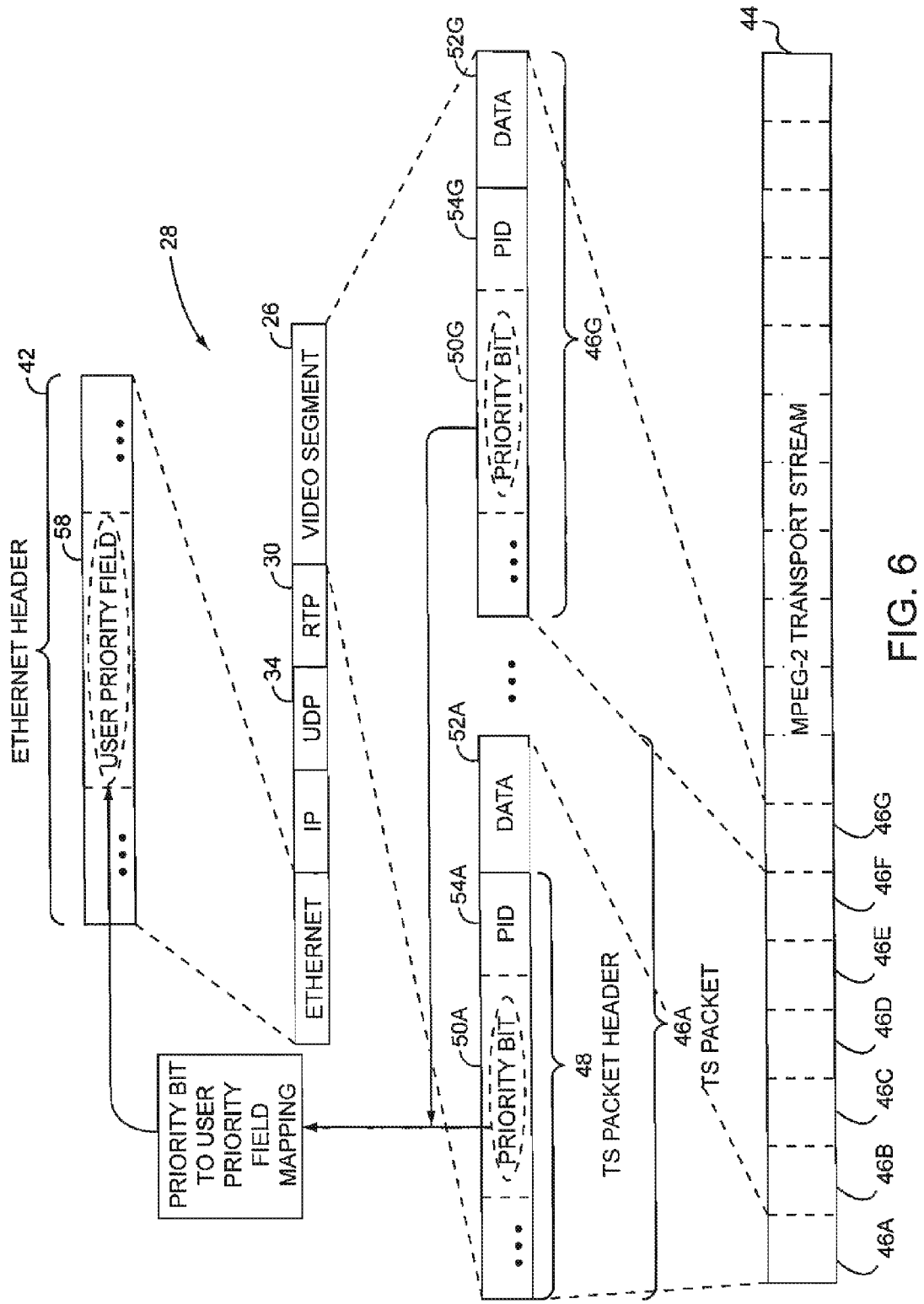
FIG. 6 is a block diagram illustrating a process for setting priority information of an Ethernet frame carrying MPEG-2 encoded video information according to one embodiment of the invention.

FIG. 6 is a block diagram illustrating a process for setting priority information of an Ethernet frame 40 carrying MPEG-2 encoded video information according to one embodiment of the invention. The description of the video stream 44, the TS packets 46, the priority bit fields 50, the PID fields 68, and the payload portions 52 are the same as described with respect to FIG. 4 and will not be repeated herein. The video segment 26 contains a plurality of TS packets 46 and is encapsulated in an RTP packet 28. The RTP packet 28 is encapsulated in a UDP packet 32 and the UDP packet 32 is encapsulated in an IP packet 36. However, unlike FIG. 4, the embodiment illustrated in FIG. 6 does not use differentiated services at the IP layer, and instead uses a user priority field 58 in the Ethernet header 48 to set the priority information of the Ethernet frame 40.

The user priority field 58 contains three bits that can be used to indicate discard precedence levels for the video segment 26. The discard precedence levels used may be in accordance with the IEEE 802.1ad standard, which is hereby incorporated by reference herein. IEEE 802.1ad specifies that the user priority field 58 can be used to define seven transmission classes and one discard precedence level ('7×1'), six transmission classes and two discard precedence levels ('6×2'), or five transmission classes and three discard levels ('5×3'). Note that a single discard level will support two discard priorities. The present invention may use any of these options depending on the number of desired discard levels. Assume for the purpose of illustration that the embodiment illustrated in FIG. 6 uses seven transmission classes and one discard level. As discussed with regard to FIG. 4, the video streamer 14 can determine if any of the priority bit fields 50A-50G are set and, if so, set the priority discard level of the user priority field 58 to a low discard precedence. Alternately, if none of the priority bit fields 50A-50G are set, the video streamer 14 can set the user priority field 58 to a high discard precedence.

If two or more discard priorities are desired, 6×2 or 5×3 options can be used. Assume that three levels of discard priorities are desired, and that the 5×3 option will be used. Further, assume that N represents the number of TS packets 46 in the video segment 26, and assume that $N_p$ represents the number of TS packets 46 that have the associated priority bit field 50 set. If $0<N_p<=N_1$, then a high discard precedence can be indicated in the user priority field 58. If $N_1<N_p<=N_2$, then a medium discard precedence can be indicated in the user priority field 58. If $N_2<N_p<=N$, then a low discard precedence can be indicated in the user priority field 58. $N_1$ and $N_2$ can be set to any desired number of TS packets 46. For example, if N=7, $N_2$ may be equal to 3, and $N_1$ may be equal to 1. The embodiment illustrated in FIG. 6 enables packet discard selection to be made by a layer two device, such as an Ethernet switch rather than a layer three device, such as a router.

Figure 7:
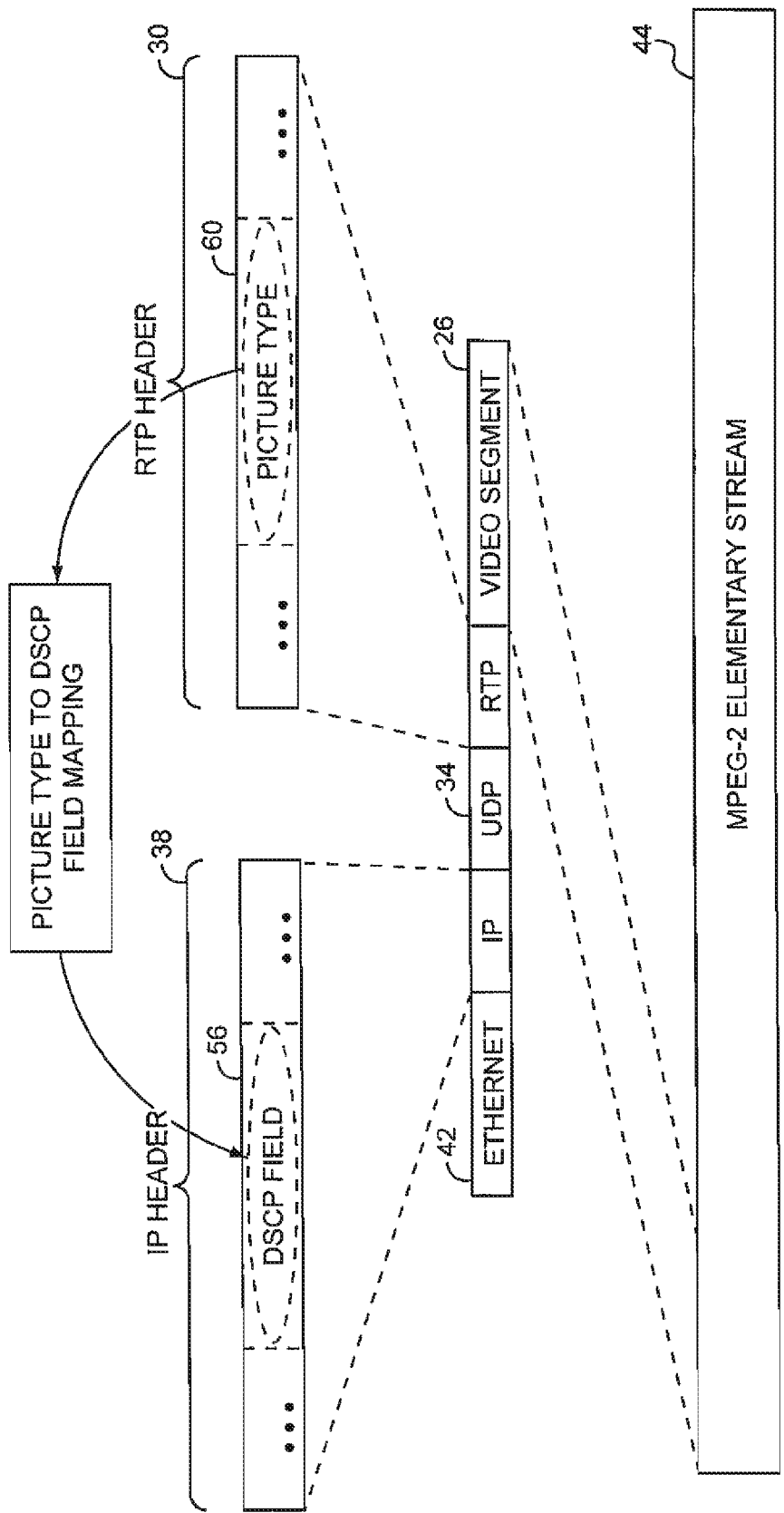
FIG. 7 is a block diagram illustrating a process for setting priority information of an IP packet carrying MPEG-2 encoded video information according to another embodiment of the invention.

FIG. 7 is a block diagram illustrating a process for setting priority information of an IP packet 36 carrying MPEG-2 encoded video information according to another embodiment of the invention. The embodiment illustrated in FIG. 7 is similar to the embodiment illustrated in FIG. 4, except the video stream 44 is an MPEG-2 elementary stream. As discussed previously, RFC 2250 describes two approaches for encapsulating an MPEG-2 video stream in an RTP packet 28. The embodiment illustrated in FIG. 7 relates to the second approach described in RFC 2250 relating to transport based on an MPEG-2 elementary stream. The video streamer 14 segments the video stream 44 into a video segment 26 in accordance with the rules contained in RFC 2250. In such an embodiment, the RTP header 30 is extended in accordance with RFC 2250 and a picture type field 60 is set to a value to indicate a picture type based on whether the video segment 26 is associated with an I-picture, a B-picture, or a P-picture. If the picture type is an I-picture, the picture type field 60 is set to a value of 1, if the picture type is a P-picture, the picture type field 60 is set to a value of 2, and if the picture type is a B-picture, the picture type field 60 is set to a value of 3.

The RTP packet 28 is then encapsulated in a UDP packet 32, which in turn is encapsulated in an IP packet 36. The video streamer 14 can set the DSCP field 56 based on the picture type field 60 and the desired number of discard precedence levels. For example, if only two discard precedence levels are desired and if the picture type field 60 indicates an I-picture or a P-picture, the DSCP field 56 can be set to the AF1LDP codepoint. If the picture type field 60 indicates a B-picture, the DSCP field 56 can be set to the AF1HDP codepoint. If three discard precedence levels are desired, and if the picture type field 60 indicates an I-picture, the DSCP field 56 can be set to the AF1LDP codepoint. If the picture type field 60 indicates a P-picture, the DSCP field 56 can be set to the AF1MDP codepoint. If the picture type field 60 indicates a B-picture, the DSCP field 56 can be set to the AF1HDP codepoint. The IP packet 36 is then encapsulated in an Ethernet frame 40 and forwarded for delivery by the network 16.

Figure 8:
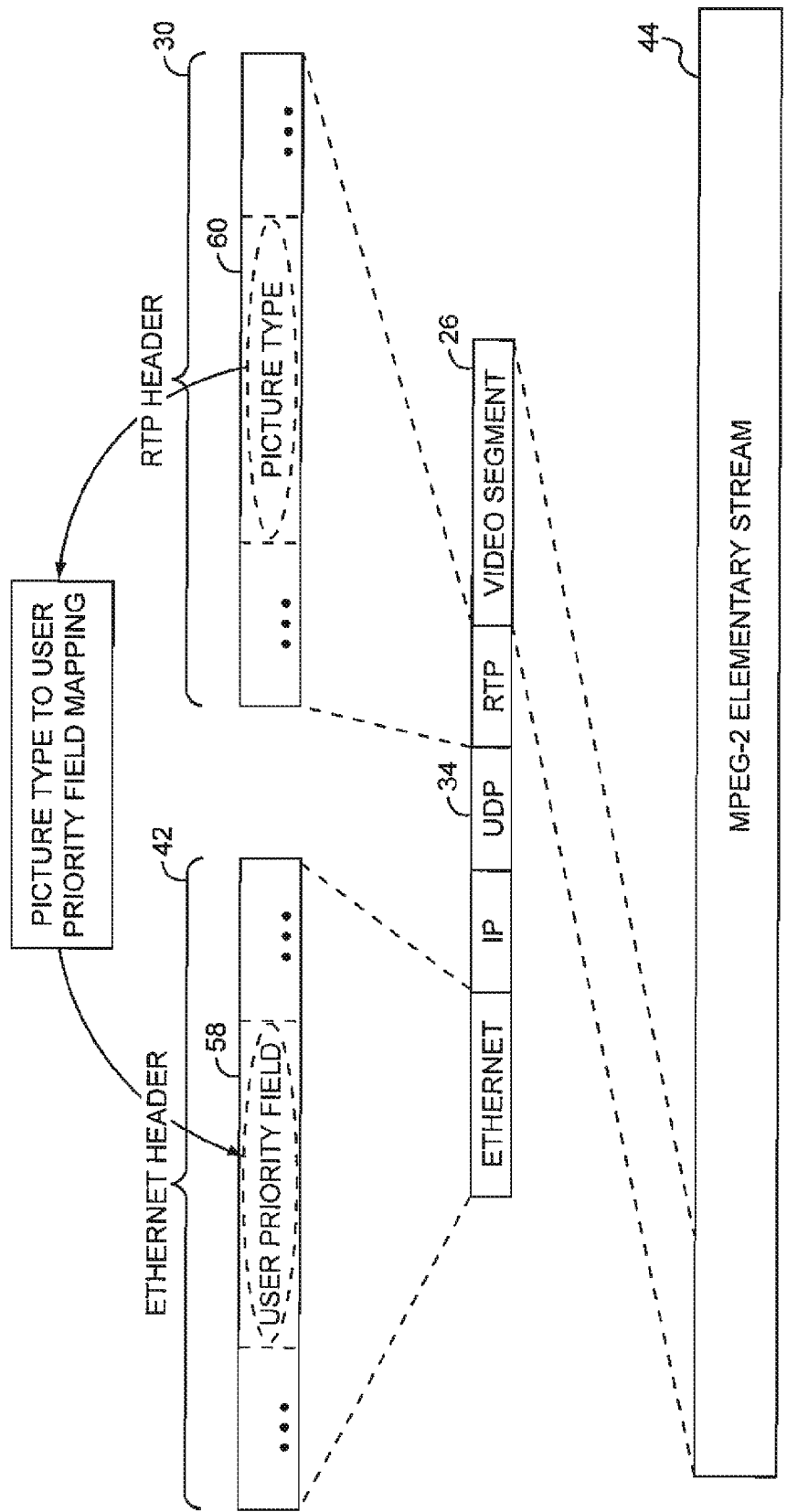
FIG. 8 is a block diagram illustrating a process for setting priority information of an Ethernet frame carrying MPEG-2 encoded video information according to another embodiment of the invention.

FIG. 8 is a block diagram illustrating a process for setting priority information of an Ethernet frame carrying MPEG-2 encoded video information according to another embodiment of the invention. As discussed with regard to FIG. 7, the video stream 44 is an MPEG-2 elementary stream. Also as discussed with regard to FIG. 7, the video streamer 14 segments the video stream 44 into a video segment 26, encapsulates the video segment 26 into an RTP packet 28, and sets the picture type field 60 based on the type of picture associated with the video segment 26. The video streamer 14 then encapsulates the RTP packet 28 in a UDP packet 32 which in turn is encapsulated into an IP packet 36. The IP packet 36 is encapsulated in an Ethernet frame 40. The video streamer 14 sets the user priority field 58 based on the picture type field 60 and the desired number of discard precedence levels desired. For example, if only two discard precedence levels are desired and if the picture type field 60 indicates an picture or a P-picture, the user priority field 58 can be set to indicate a low discard precedence. If the picture type field 60 indicates a B-picture, the user priority field 58 can be set to a high discard precedence. If three discard precedence levels are desired, and if the picture type field 60 indicates an I-picture, the user priority field 58 can be set to a low discard precedence. If the picture type field 60 indicates a P-picture the user priority field 58 can be set to a medium discard precedence. If the picture type field 60 indicates a B-picture, the user priority field 58 can be set to a high discard precedence value. The Ethernet frame 40 is then forwarded for delivery by the network 16.

Figure 9:
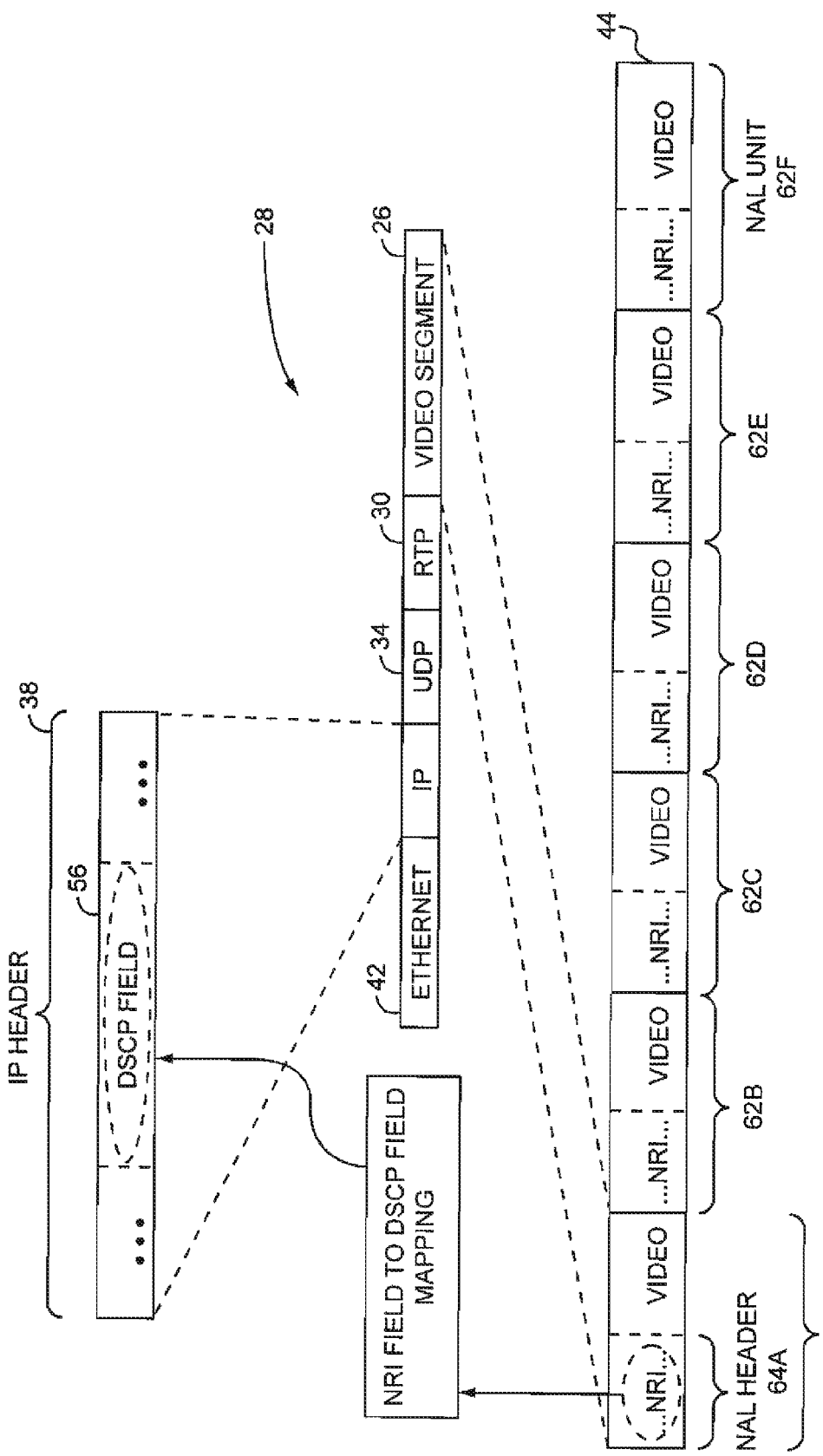
FIG. 9 is a block diagram illustrating a process for setting priority information of an IP packet carrying MPEG-4 encoded video information according to one embodiment of the invention.

FIG. 9 is a block diagram illustrating a process for setting priority information of an IP packet carrying MPEG-4 encoded video information according to one embodiment of the invention. The embodiment illustrated in FIG. 9 is similar to the embodiment illustrated in FIG. 4, except the video stream 44 is an MPEG-4 video stream. The video stream 44 comprises a plurality of NAL units, including NAL units 62A-62F. Each NAL unit 62 includes a corresponding NAL header 64A-64F. The NAL header 64 includes a 2-bit nal_ref_idc (NRI) field that indicates a priority of the video data associated with the respective NAL unit 62. In accordance with IETF Request for Comments 3984 entitled "RTP Payload Format for H.264 Video" (hereinafter "RFC 3984"), which is hereby incorporated herein by reference, the possible values of the NRI field are as follows:

an NRI value of '00' is associated with a non-reference picture;

an NRI value of '01' is associated with a coded slice data partition B;

an NRI value of '01' is associated with a coded slice data partition C;

an NRI value of '10' is associated with a non-IDR coded slice;

an NRI value of '10' is associated with a coded slice data partition A; and an NRI value of '11' is associated with a coded slice of an IDR picture.

The larger the value of the NRI field, the higher the priority of the video data associated with the respective NAL unit 62. RFC 3984 describes two methods of encapsulating NAL units 62 for transport over RTP; one method relates to encapsulating a single NAL unit 62 in each RTP packet 28, and a second method relates to encapsulating multiple NAL units 62 in each RTP packet 28. The embodiment illustrated in FIG. 9 assumes that one NAL unit 62 is encapsulated in each RTP packet 28, and thus the video segment 26 comprises one NAL unit 62, such as the NAL unit 64A. The video streamer 14 encapsulates the video segment 26 in an RTP packet 28, which in turn is encapsulated in a UDP packet 32. The UDP packet 32 is encapsulated in an IP packet 36. The DSCP field 56 can be set to the desired AF codepoint based on the value of the NRI field of the NAL unit 64A in the video segment 26 and the desired number of discard preference levels. For example, if three discard precedence levels are desired, and if the NRI value is '11,' the DSCP field 56 can be set to the AF1LDP codepoint. If the NRI value is '10' or '01,' the DSCP field 56 can be set to the AF1MDP codepoint. If the NRI value is '00,' the DSCP field 56 can be set to the AF1HDP codepoint. The IP packet 36 is then encapsulated in an Ethernet frame 40 and forwarded for delivery by the network 16.

Figure 10:
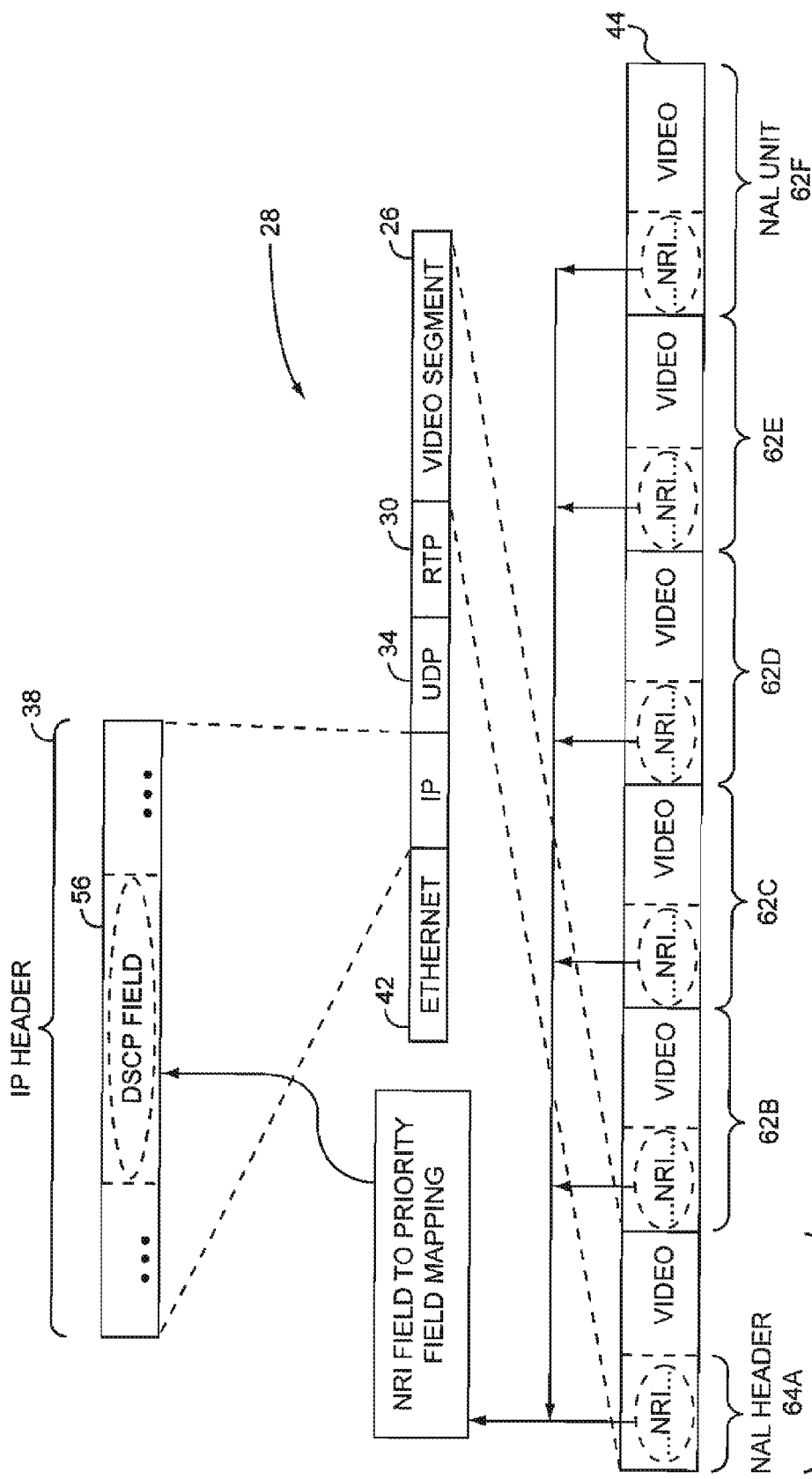
FIG. 10 is a block diagram illustrating a process for setting priority information of an IP packet carrying MPEG-4 encoded video information according to another embodiment of the invention.

FIG. 10 is a block diagram illustrating a process for setting priority information of an IP packet 36 carrying MPEG-4 encoded video information according to another embodiment of the invention. The embodiment illustrated in FIG. 10 is similar to the embodiment illustrated in FIG. 9, except the video segment 26 contains a plurality of NAL units 62. The priority of the DSCP field 56 can be set based on the NRI values of the NAL units 62 according to any desired implementation. For example, if two levels of discard precedence are desired, the priority of the DSCP field 56 may be set to the AF1LDP codepoint if any of the NRI values have a value of '11,' and set to the AF1HDP codepoint if none of the NRI values of the NAL units 62 in the video segment 26 have a value of '11.' Alternately, if three levels of discard precedence are desired, the discard precedence can be based on the number of the NAL units 62 that have an NRI value of '11.' For example, if N represents the number of NAL units 62 in the video segment 26, assume that $N_p$ represents the number of NAL units 62 that have an NRI value='11.' If $0<N_p<=N_1$, then the DSCP field 56 is set to the AF1HDP codepoint. If $N_1<N_p<=N_2$, then the DSCP field 56 is set to the AF1MDP codepoint. If $N_2<N_p<=N$, then the DSCP field 56 is set to the AF1LDP codepoint. $N_1$ and $N_2$ can be set to any desired number of NAL units 62. For example, if N=7, $N_2$ may be equal to 3, and $N_1$ may be equal to 1. After the DSCP field 56 is set to the desired AF1 codepoint, the IP packet 36 is encapsulated in the Ethernet frame 40 and forwarded over the network 16 for delivery to the end user 12.

Figure 11:
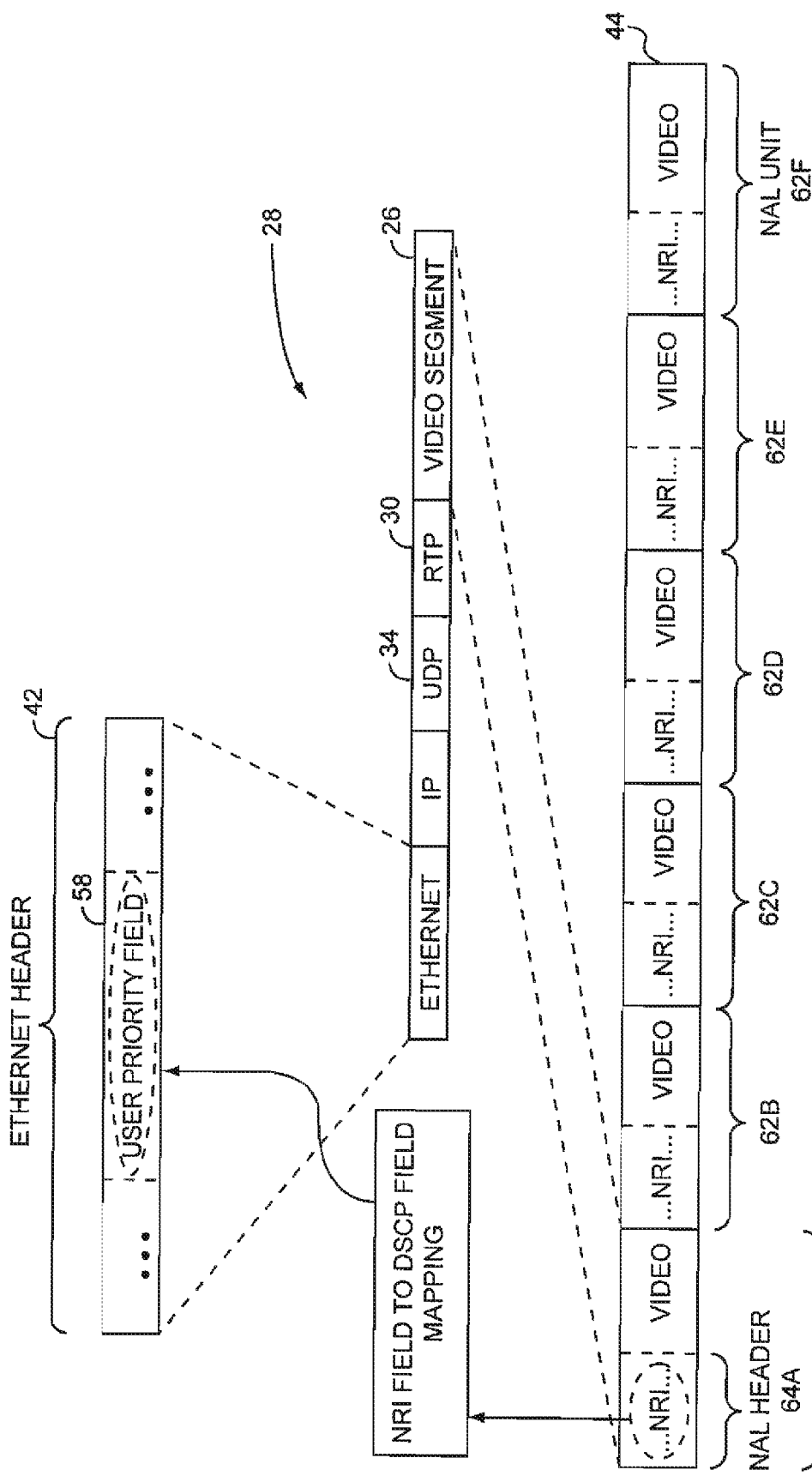
FIG. 11 is a block diagram illustrating a process for setting priority information of an Ethernet frame carrying MPEG-4 encoded video information according to one embodiment of the invention.

FIG. 11 is a block diagram illustrating a process for setting priority information of an Ethernet frame 40 carrying MPEG-4 encoded video information according to another embodiment of the invention. FIG. 11 is similar to the embodiment illustrated in FIG. 9 except rather than use the DSCP field 56 in the IP header 38, the user priority field 58 in the Ethernet header 42 is used to indicate the priority of the video segment 26. The user priority field 58 can be set based on the NRI value in the NAL header 64A in the video segment 26 based on the number of discard precedence levels desired. If two discard precedence levels are desired, the user priority field 58 can be set to a low discard precedence priority if the NRI value is '11', and set to a high discard precedence priority if the NRI value is '10', '01,' or '00'. If three discard precedence levels are desired, the user priority field 58 can be set to a low discard precedence priority if the NRI value is '11,' set to a medium discard precedence priority if the NRI value is '10' or '01,' and set to a high discard precedence priority if the NRI value is '00.' If four discard precedence priorities are desired, the user priority field 58 can be set to a low discard precedence priority if the NRI value is '11,' set to a medium discard precedence priority if the NRI value is '10,' set to a medium-high discard precedence priority if the NRI value is '01,' and set to a high discard precedence priority if the NRI value is '00.'

Figure 12:
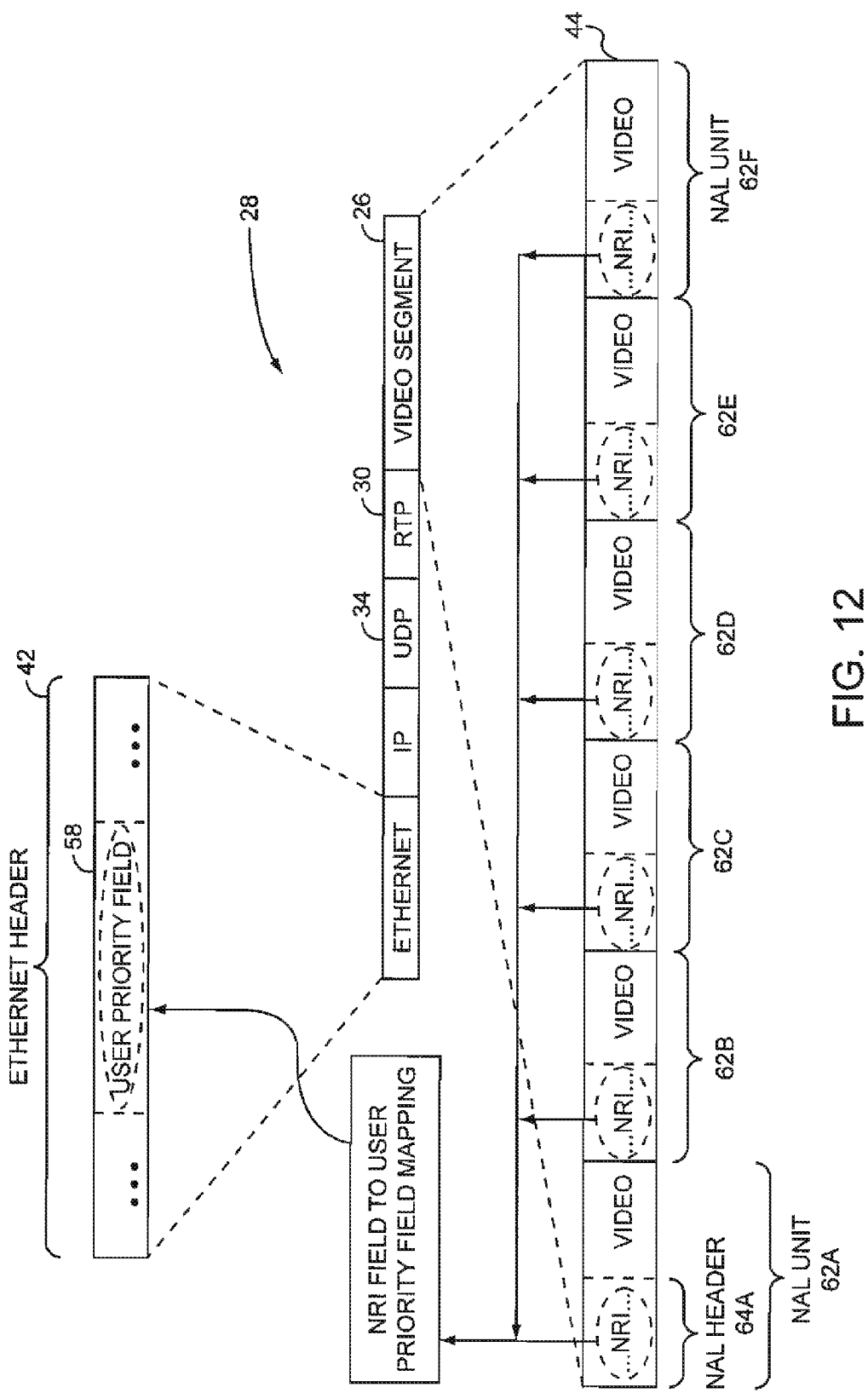
FIG. 12 is a block diagram illustrating a process for setting priority information of an Ethernet frame carrying MPEG-4 encoded video information according to another embodiment of the invention.

FIG. 12 is a block diagram illustrating a process for setting priority information of an Ethernet frame 40 carrying MPEG-4 encoded video information according to another embodiment of the invention. FIG. 12 is similar to the embodiment described in FIG. 11, except that the video segment 26 contains a plurality of NAL units 62. The user priority field 58 can be set based on the NRI values of the NAL units 62 according to any desired implementation. For example, assume that three levels of discard priorities are desired, and that the 5×3 option will be used. Further, assume that N represents the number of NAL units 62 in the video segment 26, and assume that $N_p$ represents the number of NAL units 62 that have an NRI value='11.' If $0<N_p<=N_1$, then a high discard precedence can be indicated in the user priority field 58. If $N_1<N_p<=N_2$, then a medium discard precedence can be indicated in the user priority field 58. If $N_2<N_p<=N$, then a low discard precedence can be indicated in the user priority field 58. $N_1$ and $N_2$ can be set to any desired number of NAL units 62. For example, if N=7, $N_2$ may be equal to 3, and $N_1$ may be equal to 1.

Figure 13:
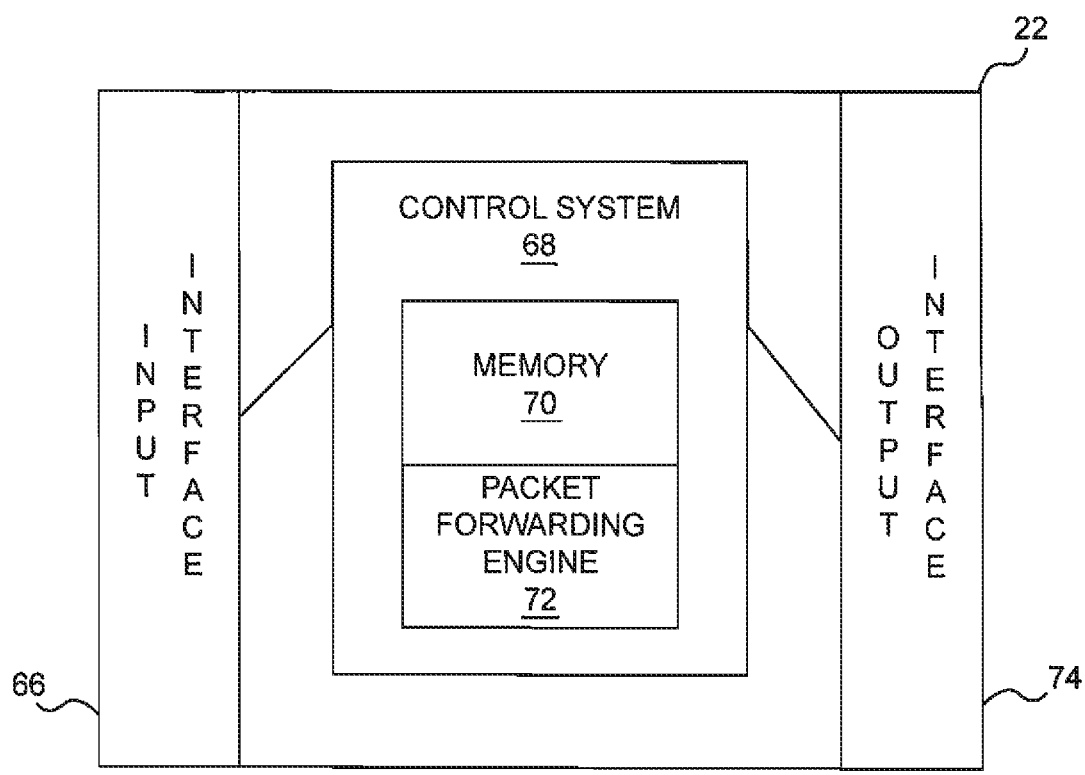
FIG. 13 is a block diagram illustrating components in a network apparatus suitable for discarding packets according to one embodiment of the invention.

FIG. 13 is a block diagram illustrating components in a switching device 22 suitable for discarding packets according to one embodiment of the invention. The switching device 22 includes an input interface 66 adapted to receive data packets 24 via the network 16. The switching device 22 includes a control system 68 that includes a memory 70 and a packet forwarding engine 72. The control system 68 can comprise a special or general purpose processor executing a proprietary or conventional operating system. The memory 70 and the packet forwarding engine 72 include software, hardware, or a combination thereof adapted to provide the functionality described herein. The packet forwarding engine 72 may operate at layer two and use the DSCP field 56 and determine whether to discard or forward the data packet 24 if the network 16 is congested. Alternately, the packet forwarding engine 72 may operate at layer two and use the user priority field 58 and determine whether to discard or forward the data packet 24 if the network 16 is congested. An output interface 74 communicates data packets 24 to another switching device 22 or an end user 12, as appropriate.

Those skilled in the art will recognize improvements and modifications to the preferred embodiments of the present invention. All such improvements and modifications are considered within the scope of the concepts disclosed herein and the claims that follow.

What is claimed is:

1. A system for providing packets of video information, the system comprising:
   a video processor configured to encapsulate in Internet Protocol (IP) packets a stream of encoded video information which is segmented into a plurality of segments, each segment of the plurality of segments being associated with a respective priority indicator which is included in the encoded video information, by:
   encapsulating a first group of segments in a payload of an IP packet, the first group of segments comprising a plurality of segments; and
   providing priority information in a header of the IP packet by:
   determining a number of segments of the first group of segments having a priority indicator indicating a high priority of a respective segment, and
   setting the priority information to a value based on the number of segments of the first group of segments having a priority indicator indicating a high priority of the respective segment; and a video output configured to transmit the IP packet.

2. The system of claim 1, wherein the video processor is configured to set the priority information to a value based on the number of segments of the first group of segments having a priority indicator indicating a high priority of the respective segment by setting the priority information to a value based on one of a plurality of number ranges to which the number corresponds.

3. The system of claim 1, wherein the video processor is configured to encapsulate the first group of segments in the IP packet by:
  encapsulating the first group of segments in a payload of a Real-time Transport Protocol (RTP) packet;
  encapsulating the RTP packet in a payload of a User Datagram Protocol (UDP) packet; and
  encapsulating the UDP packet in the payload of the IP packet.

4. The system of claim 1, wherein the priority indicator comprises a picture type.

5. The system of claim 4, wherein the video processor is configured to provide the priority information in the header of the IP packet by setting a Differentiated Service Code Point (DSCP) field of the header of the IP packet based on the picture type.

6. The system of claim 1, wherein each segment of the first group of segments comprises a Network Abstraction Layer (NAL) unit and the priority indicator comprises a nal_ref_idc (NRI) value of the NAL unit.

7. The system of claim 6, wherein the video processor is configured to provide the priority information in the header of the IP packet by setting a Differentiated Service Code Point (DSCP) field of the header of the IP packet based on the NRI value.

8. The system of claim 1, wherein the video processor is configured to:
  encapsulate a second group of segments of the plurality of segments in a second IP packet, the second group of segments comprising a plurality of segments, wherein the second group of segments is provided in a payload of the second IP packet; and
  provide second priority information based on priority indicators of the second group of segments in a header of the second IP packet, wherein the second priority information is different from the priority information based on priority indicators of the first group of segments.

9. The system of claim 1, wherein the video processor is configured to set the priority information in the header of the IP packet based on the number of segments of the first group of segments having a priority indicator indicating a high priority of the respective segment by:
  setting an Real-time Transport Protocol (RTP) priority indicator in an RTP header of a an RTP packet carrying the first group of segments based on the number of segments of the first group of segments having a priority indicator indicating a high priority of the respective segment; and
  setting the priority information in the header of the IP packet based on the RTP priority indicator.

10. A system for providing packets of video information, the system comprising:
  a video input configured to receive a stream of encoded video information;
  a video processor configured to:
    segment the stream of encoded video information into a plurality of segments, wherein each segment of the plurality of segments is associated with a respective priority indicator which is included in the stream of encoded video information;
    encapsulate a first group of segments of the plurality of segments in a payload of an Ethernet frame, the first group of segments comprising a plurality of segments; and
    provide priority information in a header of the Ethernet frame by:
      determining a number of segments of the first group of segments having a priority indicator indicating a high priority of a respective segment; and
      setting the priority information to a value based on the number of segments of the first group of segments having the priority indicator indicating a high priority of the respective segment; and
  a video output configured to transmit a Internet Protocol (IP) packet.

11. The system of claim 10, wherein the video processor is configured to set the priority information to a value based on the number of segments of the first group of segments having a priority indicator indicating a high priority of the respective segment by setting the priority information to a value based on one of a plurality of number ranges to which the number corresponds.

12. The system of claim 10, wherein the video processor is configured to encapsulate the first group of segments in the Ethernet frame by:
  encapsulating the first group of segments in a payload of a Real-time Transport Protocol (RTP) packet;
  encapsulating the RTP packet in a payload of a User Datagram Protocol (UDP) packet;
  encapsulating the UDP packet in a payload of an Internet Protocol (IP) packet; and
  encapsulating the IP packet in the Ethernet frame.

13. The system of claim 10, wherein the video processor is configured to:
  encapsulate a second group of segments of the plurality of segments in a second Ethernet frame, the second group of segments comprising a plurality of segments, wherein the second group of segments is provided in a payload of the second Ethernet frame; and
  provide second priority information based on a priority indicator of the second group of segments in a header of the second Ethernet frame, wherein the second priority information is different from the priority information based on the priority indicator of the first group of segments.

14. A network node, comprising:
  an input interface configured to receive, from a network, an Internet Protocol (IP) packet, the IP packet comprising:
    an IP packet payload comprising a plurality of video segments from a stream of encoded information, each of the plurality of video segments having an associated priority indicator which was included in the stream of encoded information; and
    an IP packet header comprising priority information based on a number of segments of the plurality of video segments having a high priority;
  an output interface; and
  at least one processor configured to:
    discard the IP packet when the network is deemed to be congested and the priority information does not meet a predetermined priority threshold; and
    forward the IP packet via the output interface when the priority information does meet the predetermined priority threshold.

15. The network node of claim 14, wherein the at least one processor is configured to forward the IP packet via the output interface when the network is not deemed to be congested.

16. The network node of claim 14, wherein the priority information is maintained in an assured forwarding field of a differentiated services code point field of the IP packet.

17. The system of claim 14, wherein the priority information in the IP packet header is set to a value based on a number of segments of the plurality of video segments having a priority indicator indicating a high priority of a respective segment.

18. A network node, comprising:
    an input interface configured to receive, from a network, an Ethernet frame, the Ethernet frame comprising:
        an Ethernet frame payload comprising a plurality of video segments from a stream of encoded information, each of the plurality of video segments having an associated priority indicator which was included in the stream of encoded information; and
        an Ethernet frame header comprising priority information based on a number of segments of the plurality of video segments having a high priority;
    an output interface; and
    at least one processor configured to
        discard the Ethernet frame when the network is deemed to be congested and the priority information does not meet a predetermined priority threshold; and
        forward the Ethernet frame via the output interface when the priority information does meet the predetermined priority threshold.

19. The network node of claim 18, wherein the at least one processor is configured to forward the Ethernet frame via the output interface when the network is not deemed to be congested.

20. The system of claim 18, wherein the priority information in the Ethernet frame header is set to a value based on the number of segments of the plurality of video segments having a priority indicator indicating a high priority of a respective segment.

* * * * *